United States Patent
Wood, Jr.

[11] 3,950,006
[45] Apr. 13, 1976

[54] RACK AND PINION STEERING ASSEMBLY

[75] Inventor: Ruey E. Wood, Jr., Eastlake, Ohio

[73] Assignee: TRW Inc., Cleveland, Ohio

[22] Filed: May 21, 1974

[21] Appl. No.: 471,979

Related U.S. Application Data

[60] Continuation of Ser. No. 288,045, Sept. 11, 1972, abandoned, which is a division of Ser. No. 34,156, May 4, 1970, Pat. No. 3,693,999.

[52] U.S. Cl. .................................. 280/96; 403/133
[51] Int. Cl.² ........................................... B62D 3/12
[58] Field of Search .......... 403/133, 135, 140, 122, 403/77; 280/95, 96, 96.2 A

[56] References Cited
UNITED STATES PATENTS

| | | | |
|---|---|---|---|
| 2,708,591 | 5/1955 | Schiesel | 403/77 |
| 2,993,716 | 7/1961 | Langen | 403/133 |
| 3,113,787 | 12/1963 | Lauderdale | 280/95 |
| 3,197,842 | 8/1965 | Parker | 403/140 |
| 3,413,023 | 11/1968 | Herbenar | 403/135 |

FOREIGN PATENTS OR APPLICATIONS

| | | | |
|---|---|---|---|
| 914,575 | 1/1963 | United Kingdom | 280/96.2 A |

Primary Examiner—M. H. Wood, Jr.
Assistant Examiner—Jack D. Rubenstein

[57] ABSTRACT

A rack and pinion steering assembly for automobiles and the like dirigible wheel equipped vehicles having a longitudinally driven rack bar connected to wheel turning tie rod linkage by ball and socket joints with thin wall, tubular metal housings or casings which are easily and inexpensively attached to the ends of the rack bar by deformation and which preload the bearings of the joints to maintain a predetermined torque on the ball studs and eliminate end play between the tie rods and the rack bar. The bearings of the joints include a bearing cup between the ball end of the stud and the rack bar composed of a resilient plastic material and a bearing ring between the ball of the stud and the free end of the housing composed of a stiff nonyielding plastics material with the cup and the ring cooperating to envelope the ball end of the stud and the tubular housing compressing the cup radially and axially so that it will expand as wear develops, preventing looseness in the joint, while the stiff bearing ring provides a stable high-tensile, nonyielding load support for the ball stud.

5 Claims, 8 Drawing Figures

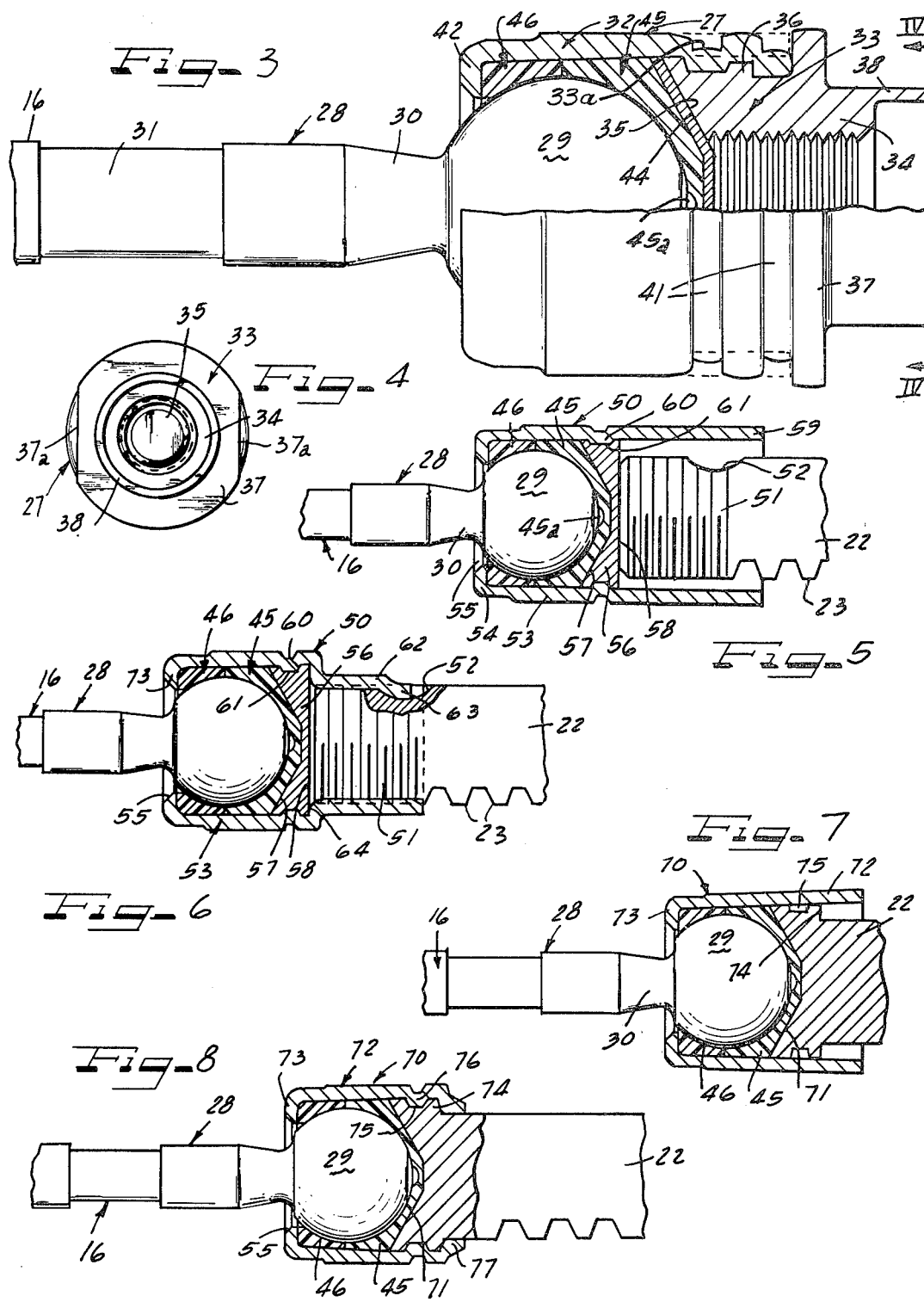

TRACK AND PINION STEERING ASSEMBLY

This is a continuation of application Ser. No. 288,045, filed Sept. 11, 1972, now abandoned, which is a division of U.S. patent application Ser. No. 34,156, filed May 4, 1970, now U.S. Pat. No. 3,693,999.

BACKGROUND OF THE INVENTION

1. Field of the Invention

This invention relates to the art of rack and pinion steering gear with ball joints on the ends of the rack bar encased in tubular housings preloading the joint bearings and deformed into fixed engagement with the rack bar.

2. Prior Art

Rack bars of rack and pinion steering assemblies have heretofore been connected to tie rod wheel turning linkages by expensive and complicated joints housed in heavy forged or machined casings closed by end plugs bottoming wear takeup springs for the joints and having threaded connections with the rack bar. Attempts to use ball and socket couplings on the ends of the rack bar or rack and pinion steering assembly have not been successful because of excessive wear between the ball stud and the socket bearing wall, and because of the excessive high unit pressure loads on low projected areas of bearing surface. Hardening of the bearing surfaces to better resist wear resulted in brittle stud shanks which could break under shock loads with disastrous results in the steering linkage. Attempts to take up wear on the joint by means of spring-loaded bearing seats and the like have not been successful because springs introduced end play, or "softness", in the linkage, and prevented positive steering reaction.

SUMMARY OF THE INVENTION

The present invention provides inexpensive connecting joints between the rack bar and the tie rod of a rack and pinion steering assembly which will transmit longitudinal shifting movements of the rack bar to the tie rod without end play, and which utilize inexpensive tubular housings deformed into locked engagement with the tie rod ends.

According to this invention the ball and socket connecting joint between the tie rod linkage and the rack bar has an inexpensive metal tubular housing easily attached to the end of the rack bar, a ball stud with a full ball end in the tubular housing, a two-part plastic bearing enveloping ball end of the stud in the housing and a means for preloading the two-part plastic bearing around the stud head. One of the plastic bearing parts is interposed between the ball end of the stud and the rack bar and is in the form of a bearing cup which supports the main compression loads to transfer the steering action from the rack bar to the tie rod linkage. This load supporting bearing cup member is a low friction highly resilient plastic. Suitable plastics for this bearing cup are polyolefin resins such as high density ethylene copolymers and polypropylene copolymers. These resins have the ability to expand when compressed and will take up wear developed during the use of the joint.

The second bearing part is in the form of a ring surrounding the stud shank and having a fragmental spherical inner surface receiving the ball end of the stud adjacent the shank. This bearing part is composed of a plastic which is stiff by comparison with the bearing cup material but also has a low coefficient friction. Suitable plastics for this bearing ring part are polyamides such as nylon, acetal resins, and polyphenolene oxide resins.

It is then an object of this invention to provide rack and pinion steering assemblies for automotive vehicles and the like having ball joints connecting the rack bars with tie rod linkages which are encased in tubular housings preloading the joint bearings and deformed into fixed relation with the rack bar.

Another object of this invention is to provide universal joint connections between the rack bar and tie rod linkages of a rack and pinion steering gear which are housed in thin metal tubes deformed into locked engagement with the rack bar.

Another object of the invention is to provide a rack and pinion steering gear assembly with preloaded plastic bearing ball joints affixed to the ends of the rack bar by deformable metal tubular housings.

A still further object of the invention is to provide a preloaded ball joint on the end of the rack bar of a rack and pinion steering gear housed in a thin metal tubular casing deformed over the end of the rack bar.

A specific object of the invention is to provide a rack and pinion steering gear with a preloaded ball joint having a bearing seated directly on the end face of the rack bar of the assembly.

A still further object of the invention is to form a preloaded ball joint assembly directly on the end of the rack bar of a rack and pinion steering gear.

Other and further objects of this invention will become apparent to those skilled in this art from the following detailed description of the annexed sheets of drawings which form a part hereof and which show several embodiments of the invention.

BRIEF DESCRIPTION OF THE DRAWINGS

FIG. 3 is a further enlarged view of the ball and socket joint of FIG. 2, shown in elevation with portions broken away in longitudinal section;

FIG. 4 is an end view of the joint of FIGS. 2 and 3 taken along the line IV—IV of FIG. 3;

FIG. 5 is a fragmentary longitudinal sectional view with parts in elevation illustrating the application of another form of ball and socket joint according to this invention to the rack bar;

FIG. 6 is a view similar to FIG. 5 but showing the assembly after attachment of the ball and socket joint to the rack bar;

FIG. 7 is a view similar to FIG. 5 showing a still further embodiment of ball and socket joint according to this invention;

FIG. 8 is a view similar to FIG. 7 showing the finished mounting of the ball and socket joint on the rack bar.

DESCRIPTION OF THE ILLUSTRATED PREFERRED EMBODIMENTS

Figure 1:
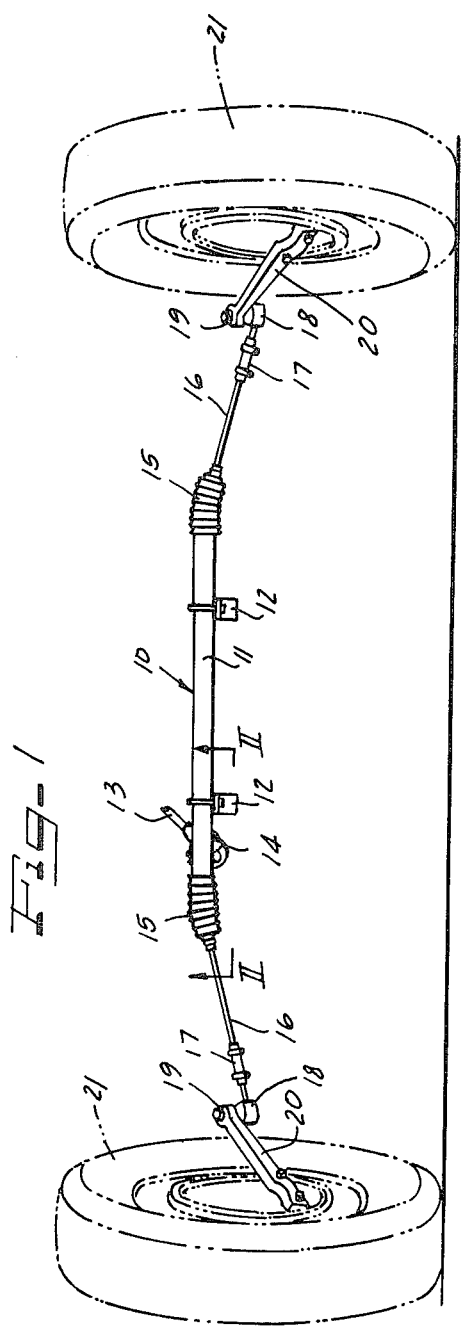
FIG. 1 is a diagrammatic isometric view of a rack and pinion steering linkage for automotive vehicles equipped with plastic bearing type ball and socket joints according to this invention.

In FIG. 1, the reference numeral 10 designates generally a rack and pinion steering linkage for automotive vehicles according to this invention. In FIG. 1 a rack and pinion housing in the form of an elongated tube 11 is mounted across the front end of an automobile as by means of mounting brackets 12, 12. A steering shaft or column 13 from the steering wheel (not shown) enters a pinion housing 14 near one end of the tubular housing 11. Rubber bellows or boots 15, 15 are secured to the ends of the housing 11 and to tie rods 16, 16 which are connected through turnbuckles 17, 17 with the stems of tie rod joint housings 18, 18 carrying studs 19, 19 which are secured to the ends of steering arms 20, 20 of the dirigible wheels 21, 21. The arrangement is such that longitudinal shifting of a rack bar in the tubular housing 11 by rotation of the steering column 13 will push or pull the tie rods 16 to swing the steering arms 20 thereby causing the wheels 21 to turn.

Figure 2:
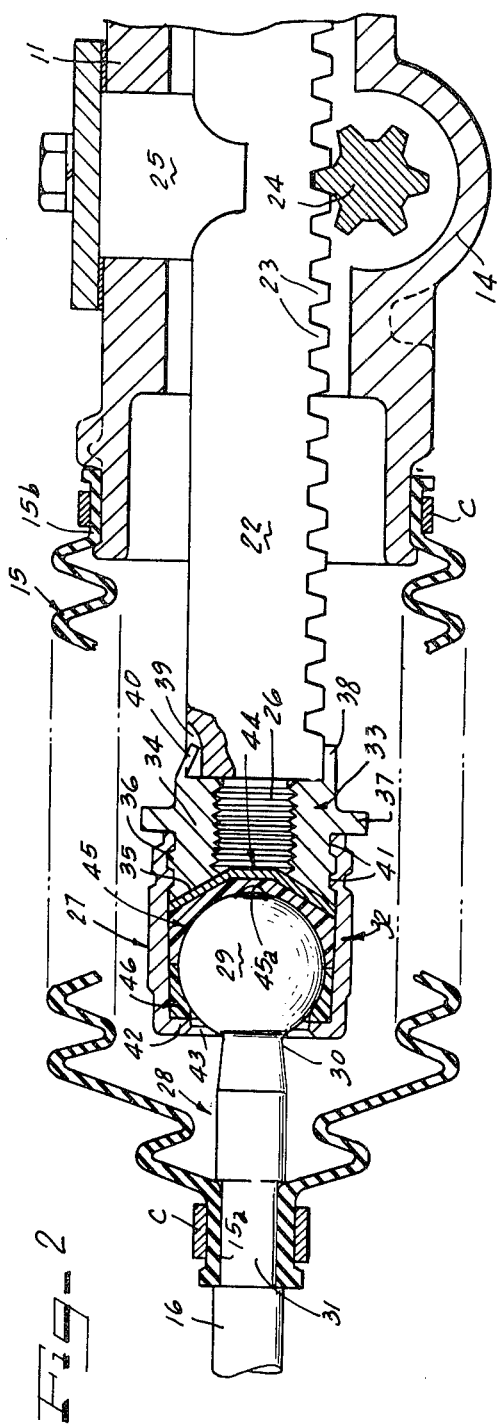
FIG. 2 is an enlarged fragmentary longitudinal sectional view of the linkage taken along the line II—II of FIG. 1.

As shown in FIG. 2, the rack and pinion steering unit has a longitudinally shiftable rack bar 22 mounted in the housing 11 with its rack teeth 23 engaged by a pinion 24 that is rotated by the steering shaft 13. A bearing saddle 25 carried by the housing slidably supports the rack bar 22 opposite the pinion 24 so that the teeth of the rack will remain meshed with the teeth of the pinion.

The ends of the rack bar 22 project beyond the ends of the housing 11 and as illustrated in FIG. 2 the terminal end of the rack bar 22 has a reduced diameter externally threaded stud portion 26 thereon.

According to this invention, the tie rods 16 are connected to the ends of the rack bar 22 by means of plastic bearing equipped ball and socket joints 27. These joints have a ball stud 28 with a full ball end 29 and a stem projecting from the ball end that provides the tie rod 16. This tie rod stem 16 has a tapered neck portion 30 providing for the required degree of articulation and a reduced diameter portion 31 receiving the small neck end 15a of the rubber bellows 15. The large neck end 15b of this bellows is received on the end of the housing 11 and clamps C lock the necks respectively to the tie rods 16 and the housing 11.

The joint 27 has a housing composed of a metal tube 32 and a metal end closure adapter 33. This adapter is tubular and has a main internally threaded body portion 34 with a conically recessed outer end 35, a circumferential bead 36 adjacent this tapered end 35, a radially projecting head flange 37 beyond the bead 36 and a relatively thin collar portion 38 at the end thereof opposite the tapered recessed end. The head 37 has flats 37a for engagement by a wrench as shown in FIG. 4.

The internal threads of the body 34 mate with the externally threaded stud end 26 of the rack bar 22 and the adapter is threaded on this stud to be bottomed against the shoulder at the end of the rack bar with the collar portion 38 overlying the end of the rack bar. The end of the rack bar has a key slot 39 and a portion of the thin collar 38 of the adapter is depressed at 40 into this key slot for locking the adapter to the rack bar.

The tubular sleeve part 32 has an open end disposed around the adapter which is radially pressed at both sides of the bead 36 to provide inwardly projected ribs 41 straddling the bead 36 and fixedly locking the tube 32 to the end closure adapter 33. The tubular sleeve 32 is plastically deformed radially inwardly into an annular groove 33a formed in the adapter 33. The opposite end of the tube 32 has a radially inturned flange 42 surrounding a circular reduced diameter opening 43 sufficiently large to freely accommodate the neck 30 of the ball stud 28 so as not to interfere with wide angle tilting of the stud relative to the housing.

A dished metal closure disc 44 rests on the tapered end face 35 of the end closure adapter 33 in the housing 32 and has a flat bottom portion spanning the threaded hole through the adapter.

The ball end 29 of the stud 28 is enveloped by two plastic bearing members 45 and 46 in the housing 32. The member 45 is in the form of a closed bottom cup with a hemispherical interior sized for receiving the ball end 29 of the stud, a cylindrical side wall press fit in the tubular housing 32 and a tapered bottom fitting the closure disc 44. A recess 45a is provided in the bottom to form a well or pocket for lubricant.

The plastic bearing member 46 is in the form of a continuous ring with a fragmental spherical inner wall sized for receiving that portion of the ball end 29 adjacent the neck 30, a cylindrical side wall press fitting in the tubular housing 32 and flat end faces respectively bottomed on the inturned flange 42 and on the adjacent end rim of the cup member 45.

The ring member 46 thus has one end about level with the equator of the ball end 29 and an opposite end bottomed on the flange 42 with the opening therethrough substantially mating with the opening 43 in the flange 42.

The bearing cup 45 is composed of a high density but resilient plastic material having a low coefficient of friction and capable of being compressively loaded with elastic memory to regain its free state size and shape. Suitable plastics for this ring are high density polyolefins such as "Marlex" sold by Phillips Chemical Company and including high density ethylene copolymers and polypropylene copolymers. Other suitable ethylene copolymer materials for the bearing cup 45 are "Alathon" sold by DuPont, "Forti-Flex" sold by Celanese Plastics Company and the like materials characterized by stiffness, resistance to environmental stresses and heat resistant but still having a degree of resilience and good elastic memory.

The ring bearing member 46 is composed of a rather stiff load carrying plastic material having a low coefficient of friction and a low cold flow factor. The material should provide a stable high tensile load support and polyamide type plastic materials have been found especially useful. Examples of such materials are nylon resins sold under the trademark "ZYTEL" by DuPont, acetal resin sold under the trademark "DELRIN" by DuPont, polyphenylene oxide resins sold under the trademarks "PPO" and "NORYL" by General Electric Company and the like.

The tubular housing member 32 with the stacked closure disc 44, bearing cup 45 and bearing ring 46 therein is pressed onto the adapter 33 to firmly bottom the closure disc 44 on the conical end 35 of the adapter and to compressively load the plastic bearing parts 45 and 46 to a predetermined degree. This preloading of the assembly compresses the bearing cup 45 establishing a desired torque resistance for movement of the ball end in the bearing assembly. When the desired preload has been established, the end of the tube is swedged over the bead 36 of the adapter to firmly lock the tube to the adapter and thereby providing an assembly with a fixed preload on the ball stud. This assembly is then easily applied to the threaded end of the rack bar and locked on the rack bar by depressing a localized detent tab portion 40 of the collar 38 into the key way 39.

The initial assembly of the stacked components in the tubular housing part 32 can include sufficient lubricant to accommodate low breakaway of movement of the ball end 29 in the socket and to provide a greased for life joint. Should it become necessary to replace the joint assembly, however, it can be easily removed by lifting the key portion 40 out of the key way 39 and unthreading the adapter from the end of the rack bar.

The stiff and relatively incompressible plastic bearing ring 46 supports tension loads between the rack bar end 22 and tie rod 16 while the compressed bearing cup 45 supports compression loads between these two parts. Both tension and compression loads are transmitted without loss of steering since the preload on the joint assembly prevents any end play or looseness.

It will be understood that the tie rods 16 can rotate about their own axes without transmitting any twisting loads to the rack bar 22. In addition, the tie rods 16 can tilt relative to the rack bar 22 in all directions throughout a wide angular range. Because the ball end 29 is substantially completely enveloped in special plastic bearing material, road shocks on the wheels are not transmitted to the rack bar 22 in the same sense as occurs in universal couplings and the like metal to metal joints that have been used heretofore.

While the tubular housing 32 is illustrated as being bottomed on the head flange 37 of the adapter, it will be appreciated that prior to the deformation of the end of the tube around the bead 36, the tube end will be spaced from this head 37 so as not to interfere with the desired preloading of the components in the tube as illustrated in dotted lines in FIG. 3.

In FIGS. 5 and 6, a modified ball and socket joint 50 is illustrated and parts substantially identical with and functioning in the same way as parts described in connection with the joint 27 of FIGS. 1 to 4 have been marked with the same reference numerals. In the arrangement of FIGS. 5 and 6, however, the rack bar 22 has a threaded end 51 of the same diameter as the bar and with a key slot 52 in this threaded end.

The housing for the joint is an elongated metal tube 53 with an inturned radial flange 54 at one end surrounding a circular opening 55 freely accommodating the neck 30 of the stud 38 therethrough.

An end closure or adapter plate 56 fits in the tube and has a dished end face 57 receiving the bearing cup 45. This end closure or adapter plate 56 has a flat end wall 58 opposite the end face 57.

The tube 53 is initially provided with a straight cylindrical open end 59 as shown in FIG. 5 which is larger than the rack bar 22, being of the same internal diameter as the outer peripheries of the plastic bearing members 45, 46 and the closure disc 56.

The stacked components in the open end tube are preloaded as described above in connection with the joint 27 and the tube is swedged to form an internal rib 60 seated in a peripheral groove 61 of the closure plate 56. This firmly locks the closure plate to the tube and holds the parts in preloaded condition. Then in addition, the portion of the tube beyond the rib 60 is swedged to a reduced diameter for fitting the threaded end 51 of the rack bar. The reduced collar portion 62 is internally threaded to receive the threaded end 51 of the rack bar and a localized detent tab portion 63 is depressed into the key way 52 of the rack bar. In addition, a shoulder 64 is formed overlying the closure plate 56.

The reduction of the end 62 of the tube can take place on the rack bar to form an integrated assembly or the tube end 62 may be initially formed and internally threaded to be later mounted on the threaded end of the rack bar.

FIGS. 7 and 8 illustrate a further modified ball and socket connection 70 between the rack bar 22 and the tie rod 16. In this modified arrangement the rack bar has a conically recessed end wall 71 directly seating the bearing cup 45. A tubular housing 72 is provided with the radially inturned flange 73 at one end accommodating the neck 30 of the stud 28. The housing, as shown in FIG. 7, has a somewhat tapered side wall with an open end fitting over the end of the rack bar 22 which has a head portion 74 with a peripheral groove 75 therearound and with the tube snugly engaging this head portion 74. The tube 72 is pushed onto the head portion 74 to preload the bearing components therein providing the desired load on the ball end 29. Then, as illustrated in FIG. 8, the free end of the tube 72 is swedged around the rack bar head 74 to provide a rib 76 in the groove 75 and an end wall 77 gripping the rack bar and providing another shoulder for locking the housing onto the rack bar.

In the joint 70, the housing 72 becomes an integral portion of the rack bar intended for permanent assembly throughout the entire life of the rack and pinion unit.

From the above descriptions, it should therefore be understood that this invention provides preloaded ball and socket joints housed in thin-walled, tubular metal casings deformed into locked engagement with the rack bar of a rack and pinion steering gear to form articulated connections between the rack bar and tie rod linkage.

I claim as my invention:

1. A rod joint for connecting the rack of a rack and pinion steering assembly to a tie rod having a ball end comprising bearing means for enclosing the ball end of the tie rod, said bearing means including a pair of plastic bearing seats having arcuate inner surfaces disposed in engagement with the ball end of the tie rod and circular outer surfaces, a metal housing having a generally cylindrical wall with an inner surface disposed in abutting engagement with said circular outer surfaces of said plastic bearing seats, said housing having an inturned axially outer end portion at least partially defining an aperture through which the tie rod extends and forming a shoulder abutment which is engaged by one of said bearing seats to retain said bearing means and tie rod ball end in said housing, an end closure adapter at least partially disposed within said housing adjacent to an inner end portion of said housing opposite from said inturned outer end portion of said housing and connected with an end of the rack, said end closure adapter axially retaining said bearing means and cooperating with said shoulder abutment to apply an axial preload force to said bearing seats, said end closure including surface means defining an annular groove and an annular bead disposed axially outwardly from said annular groove, said generally cylindrical wall of said housing being plastically deformed radially inwardly into abutting engagement with a bottom portion of said annular groove and being disposed in abutting engagement with opposite annular side surfaces of said bead to retain said housing and end closure against axial movement relative to each other under the influence of the preload force and operating forces applied to the bearing seats, said wall of said housing including an outer surface which defines a groove in said wall where said wall is plastically deformed radially inwardly into said annular groove in said end closure adapter, and means for preventing relative rotation between said housing and said rack, said means for preventing relative rotation between said housing and said rack including a detent tab which extends into a recess formed in said rack.

2. A rod joint as set forth in claim 1 wherein said end closure includes a generally frustroconical end surface for bottoming said bearing means, said generally frustroconical end surface sloping radially and axially outwardly toward said ball end of the tie rod to enable preload forces having radial and axial components to be transmitted between said end closure and said bearing means.

3. A rod joint as set forth in claim 1 wherein end closure adapter includes an internally threaded opening to receive an externally threaded end portion of said rack.

4. A rod joint as set forth in claim 1 wherein said wall of said housing extends past said end closure and has an inner surface disposed in abutting engagement with the end portion of the rack at a location axially inwardly from said bead.

5. A rod joint as set forth in claim 1 wherein the end of the rack is disposed in abutting engagement with said end closure, said housing wall being connected with the rack at a location axially inwardly from said bead to hold said housing wall and end closure against axial movement relative to the rack.

* * * * *